(12) United States Patent
Lu et al.

(10) Patent No.: US 12,015,296 B2
(45) Date of Patent: Jun. 18, 2024

(54) CHARGING METHOD AND APPARATUS

(71) Applicant: Huawei Technologies Co., Ltd., Shenzhen (CN)

(72) Inventors: Peng Lu, Shenzhen (CN); Xiaohu He, Dongguan (CN); Jun Wu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 452 days.

(21) Appl. No.: 17/342,878

(22) Filed: Jun. 9, 2021

(65) Prior Publication Data

US 2021/0296921 A1    Sep. 23, 2021

Related U.S. Application Data

(63) Continuation of application No. PCT/CN2019/107321, filed on Sep. 23, 2019.

(30) Foreign Application Priority Data

Dec. 10, 2018 (CN) ......................... 201811506444.7

(51) Int. Cl.
*H02J 7/00* (2006.01)
*B60L 53/62* (2019.01)

(52) U.S. Cl.
CPC ............ *H02J 7/0049* (2020.01); *B60L 53/62* (2019.02); *H02J 7/0048* (2020.01); *H02J 7/007182* (2020.01)

(58) Field of Classification Search
CPC .. H02J 7/0049; H02J 7/0048; H02J 7/007182; B60L 53/62

USPC ........................................................ 320/162
See application file for complete search history.

(56) References Cited

U.S. PATENT DOCUMENTS

| 5,561,360 A | 10/1996 | Ayres et al. | |
| 2007/0188141 A1* | 8/2007 | Hamaguchi | H02J 7/005 320/128 |
| 2007/0188148 A1* | 8/2007 | Kawasumi | H02J 7/0031 320/134 |
| 2008/0150491 A1* | 6/2008 | Bergveld | G01R 31/3828 320/149 |

(Continued)

FOREIGN PATENT DOCUMENTS

| CN | 102057553 A | 5/2011 |
| CN | 105548889 A | 5/2016 |

(Continued)

OTHER PUBLICATIONS

He, L., "*-Aware Charging of Lithium-Ion Battery Cells," ACM/IEEE 7th Internatonal Conference On Cyber-Physical Systems (ICCPS), Apr. 11, 2016, 10 pages.

(Continued)

*Primary Examiner* — Suresh Memula
(74) *Attorney, Agent, or Firm* — Conley Rose, P.C.

(57) ABSTRACT

A charging method, where in a process of performing constant voltage charging on a battery at a charging voltage that is greater than an end-of-precharge voltage and less than a maximum charging voltage, a charging apparatus determines a current relaxation time and controls a charging current and a charging voltage based on the current relaxation time, to adaptively charge the battery.

20 Claims, 8 Drawing Sheets

(56) References Cited

U.S. PATENT DOCUMENTS

| | | | |
|---|---|---|---|
| 2008/0278111 A1* | 11/2008 | Genies | H02J 7/35 320/101 |
| 2009/0015209 A1* | 1/2009 | Morina | H02J 7/0071 320/164 |
| 2009/0140697 A1* | 6/2009 | Hurley | H02J 7/04 320/139 |
| 2009/0256528 A1 | 10/2009 | Greening et al. | |
| 2011/0285356 A1 | 11/2011 | Maluf et al. | |
| 2014/0019789 A1 | 1/2014 | Bhardwaj et al. | |
| 2015/0028819 A1 | 1/2015 | Yau et al. | |
| 2015/0102779 A1 | 4/2015 | Schumacher et al. | |
| 2015/0188100 A1 | 7/2015 | Isozaki et al. | |
| 2016/0020618 A1* | 1/2016 | Yang | H02J 7/04 320/162 |
| 2016/0099593 A1* | 4/2016 | Lim | H02J 7/0068 320/114 |
| 2016/0116548 A1 | 4/2016 | Ghantous et al. | |
| 2017/0194797 A1* | 7/2017 | Jung | H02J 7/007182 |
| 2018/0306868 A1* | 10/2018 | Kim | H02J 7/00306 |
| 2018/0351381 A1* | 12/2018 | Shin | H02J 7/00032 |
| 2019/0072618 A1* | 3/2019 | Ghantous | H02J 7/005 |
| 2019/0120910 A1* | 4/2019 | Ghantous | G01R 31/392 |
| 2019/0148964 A1* | 5/2019 | Fasching | H01M 10/46 320/139 |
| 2020/0161877 A1* | 5/2020 | Zhang | H02J 7/00302 |
| 2021/0006081 A1* | 1/2021 | Tan | H02J 7/007182 |
| 2022/0190614 A1* | 6/2022 | Jung | H02J 50/40 |
| 2023/0009288 A1* | 1/2023 | Kang | B60L 3/0046 |
| 2023/0035744 A1* | 2/2023 | Gao | H02J 7/007182 |
| 2023/0268763 A1* | 8/2023 | Li | H02J 7/0024 320/116 |

FOREIGN PATENT DOCUMENTS

| | | | | |
|---|---|---|---|---|
| CN | 105738815 A | | 7/2016 | |
| CN | 105932734 A | | 9/2016 | |
| CN | 111293739 A | * | 6/2020 | .......... H01M 10/425 |
| EP | 4290648 A1 | * | 12/2023 | |
| IN | 102906961 A | | 1/2013 | |
| IN | 104752657 A | | 7/2015 | |
| JP | 2006286562 A | | 10/2006 | |
| JP | 5949510 B2 | | 7/2016 | |
| WO | WO-2014184338 A1 | * | 11/2014 | ............ H02J 7/0052 |
| WO | WO-2017215266 A1 | * | 12/2017 | |
| WO | WO-2019111226 A1 | * | 6/2019 | ............ H01M 10/44 |
| WO | WO-2019162750 A1 | * | 8/2019 | ............ G01R 31/387 |
| WO | WO-2019187692 A1 | * | 10/2019 | .......... H01M 10/425 |

OTHER PUBLICATIONS

Tang, Y., et al, "Relaxation behavior simulation of power lithium-ion battery in high-rate charging-discharging process," Acta Phys. Sin., vol. 65, No. 5, 2016, 10 pages.

Yiwei, T., et al, "Relaxation Behavior Simulation of Power Lithium-ion Battery in High-Rate Charging-Discharging Process," Acta Phys. Sin., vol. 65, No. 5, 2016, 20 pages (with English translation).

* cited by examiner

CHARGING METHOD AND APPARATUS

CROSS-REFERENCE TO RELATED APPLICATIONS

This application is a continuation of International Patent Application No. PCT/CN2019/107321 filed on Sep. 23, 2019, which claims priority to Chinese Patent Application No. 201811506444.7 filed on Dec. 10, 2018. The disclosures of the aforementioned applications are hereby incorporated by reference in their entireties.

TECHNICAL FIELD

This application relates to the field of electronic technologies, and in particular, to battery technologies.

BACKGROUND

A secondary battery is a battery that can still be used after discharge by activating an electrode active material through charging.

A charging method for a secondary battery is continuously charging the battery to a potential at a constant current, and then performing constant voltage charging on the battery at the potential. In a charging process, a material, a kinetic process, ohmic impedance, and the like in the battery all change. However, the charging method cannot adapt to the changes, resulting in a relatively rapid increase in a temperature of the battery in the charging process, and relatively low cycle performance of the battery, and relatively short battery life.

SUMMARY

This application provides a charging method and apparatus, to effectively resolve problems such as a relatively rapid increase in a temperature of a battery in a charging process, and relatively low cycle performance and relatively short battery life.

To achieve the foregoing objectives, the following technical solutions are used in this application.

According to a first aspect, a charging method is provided, applied to a charging apparatus for charging a battery. When a charging voltage is greater than an end-of-precharge voltage (a critical voltage at which the battery changes from an overdischarge state to a normal discharge state) and less than a maximum charging voltage (which is used to represent a withstand voltage of a positive electrode material, an electrolyte, or a positive electrode current collector of the battery), the charging apparatus charges the battery only in a constant voltage charging manner (different charging voltages are used in different time periods), or charges the battery in a hybrid manner of constant voltage charging and constant current charging (for example, constant voltage charging alternates with constant current charging, or m (m≥2) times of constant voltage charging are performed after constant current charging, or the like)), until a voltage of the battery reaches the maximum charging voltage. After the voltage of the battery reaches the maximum charging voltage, the charging battery performs constant voltage charging on the battery at the maximum charging voltage until a quantity of electricity in the battery reaches a full-charge quantity of electricity (a quantity of electricity when the battery is fully charged).

The charging apparatus performs constant voltage charging on the battery at a present charging voltage that is greater than the end-of-precharge voltage and less than the maximum charging voltage of the battery. In a process of performing constant voltage charging on the battery at the present charging voltage, the charging apparatus determines a current relaxation time used to reflect a change of an electrochemical reaction rate in the battery, obtains a present state of charge (SOC) of the battery, and calculates a would-be charging current based on the current relaxation time and the present SOC of the battery. After the would-be charging current is calculated, the charging apparatus performs step D, or determines a voltage corresponding to the would-be charging current as a would-be charging voltage and performs step E. Step D includes charging apparatus performs constant current charging on the battery at the would-be charging current, and if a voltage of the battery reaches a first preset threshold (a voltage of the first preset threshold is less than the maximum charging voltage) in a constant current charging process, the charging apparatus determines the voltage of the first preset threshold as a would-be charging voltage, and perform step E, or if a voltage of the battery reaches the maximum charging voltage in a constant current charging process, the charging apparatus performs constant voltage charging on the battery at the maximum charging voltage. Step E includes charging apparatus performs constant voltage charging on the battery at the would-be charging voltage, where the would-be charging voltage is a present charging voltage, and the charging apparatus repeats the foregoing charging process until the would-be charging voltage reaches the maximum charging voltage.

In the charging process, a charging current changes, and the change of the charging current corresponds to a change of an electrochemical reaction rate on an electrode surface of the battery. Correspondingly, the current relaxation time may indirectly reflect the change of the electrochemical reaction rate in the battery. In this embodiment of this application, the charging apparatus adjusts the charging current and the charging voltage based on the current relaxation time. This can better adapt to a change inside the battery in the charging process, improve safety and reliability of the battery in the charging process, effectively enhance cycle performance of the battery, and effectively prolong battery life.

In a possible implementation, a method for "determining, by the charging apparatus, a current relaxation time" is as follows. The charging apparatus determines a first moment and a second moment, and determines the current relaxation time based on the first moment and the second moment. Herein, the first moment is a moment at which a peak value of a charging current occurs in the process of performing constant voltage charging on the battery at the present charging voltage. The second moment is a moment at which a value of the charging current is a second preset threshold or a change rate of the charging current is less than a preset change rate in the process of performing constant voltage charging on the battery at the present charging voltage. The first moment is earlier than the second moment.

The charging apparatus may determine the current relaxation time in various manners. The foregoing manner of determining the current relaxation time based on the first moment and the second moment is only one possible implementation.

In another possible implementation, a method for "calculating, by the charging apparatus, a would-be charging current based on the current relaxation time and the present SOC of the battery" is as follows. The charging apparatus calculates the would-be charging current according to a formula $I=C+K\times\tau^M(SOC)$. In the formula, I represents the would-be charging current, $\tau$ represents the current relaxation time, SOC represents the present SOC of the battery, K is a proportionality coefficient, C is a constant greater than or equal to 0, M is an exponent coefficient, and $M\neq 0$.

A charging parameter in this application includes at least one of the constant C, the proportionality coefficient K, or the exponent coefficient M. The charging parameter is preset or is set based on a battery parameter. Herein, the battery parameter includes at least one of the present SOC of the battery, a present state of health (SOH) of the battery, the current relaxation time, a present temperature of the battery, or a present state of safety (SOS) of the battery.

Certainly, an algorithm or a formula used by the charging apparatus for calculating the would-be charging current is not limited. In addition to the foregoing formula, another formula may be further used by the charging apparatus for calculating the would-be charging current.

In another possible implementation, if the charging parameter is set based on the battery parameter, the charging apparatus may further adjust the charging parameter based on the battery parameter.

In another possible implementation, after determining the current relaxation time, the charging apparatus determines, based on the current relaxation time, whether the battery ages/internally short-circuits. If the battery ages/internally short-circuits, the charging apparatus gives an alarm or stops charging.

The current relaxation time may indirectly reflect the change of the electrochemical reaction rate in the battery. The charging apparatus may determine, based on the current relaxation time, whether the battery ages/internally short-circuits and perform, based on a determined result, corresponding processing. This effectively improves safety and reliability of the battery in the charging process.

According to a second aspect, a charging apparatus is provided, where the charging apparatus is configured to charge a battery. The charging apparatus in this application includes a control unit, a charging unit, and an electricity integration unit.

Further, the charging unit is configured to perform constant voltage charging or constant current charging on the battery under control of the control unit. The electricity integration unit is configured to determine an SOC of the battery. The control unit is configured to perform steps A, B, C, D, and E.

Step A includes controlling the charging unit to perform constant voltage charging on the battery at a present charging voltage, where the present charging voltage is greater than an end-of-precharge voltage and less than a maximum charging voltage, the maximum charging voltage herein is used to represent a withstand voltage of a positive electrode material, an electrolyte, or a positive electrode current collector of the battery, and the end-of-precharge voltage is a critical voltage at which the battery changes from an overdischarge state to a normal discharge state. Step B includes, in a process of controlling the charging unit to perform constant voltage charging on the battery at the present charging voltage, determining a current relaxation time used to reflect a change of an electrochemical reaction rate in the battery. Step C includes obtaining a present SOC of the battery from the electricity integration unit, calculating a would-be charging current based on the current relaxation time and the present SOC of the battery, and performing step D after obtaining the would-be charging current through calculation, or determining a voltage corresponding to the would-be charging current as a would-be charging voltage and performing step E. Step D includes controlling the charging unit to perform constant current charging on the battery at the would-be charging current, and if a voltage of the battery reaches a first preset threshold in a constant current charging process, determining a voltage of the first preset threshold as a would-be charging voltage, and performing step E, where the voltage of the first preset threshold is less than the maximum charging voltage, or if a voltage of the battery reaches the maximum charging voltage in a constant current charging process, performing constant voltage charging on the battery at the maximum charging voltage until a quantity of electricity in the battery reaches a full-charge quantity of electricity. Step E includes controlling the charging unit to perform constant voltage charging on the battery at the would-be charging voltage, repeating the steps A, B and C in a constant voltage charging process until the would-be charging voltage reaches the maximum charging voltage, and performing constant voltage charging on the battery at the maximum charging voltage until a quantity of electricity in the battery reaches a full-charge quantity of electricity, where the full-charge quantity of electricity is a quantity of electricity when the battery is fully charged.

In a possible implementation, that the control unit is configured to determine a current relaxation time includes that the control unit is further configured to determine a first moment and a second moment, and determine the current relaxation time based on the first moment and the second moment. Herein, the first moment is a moment at which a peak value of a charging current occurs in the process of controlling the charging unit to perform constant voltage charging on the battery at the present charging voltage, the second moment is a moment that is in the process of controlling the charging unit to perform constant voltage charging on the battery at the present charging voltage and at which a value of the charging current is a second preset threshold or a change rate of the charging current is less than a preset change rate. The first moment is earlier than the second moment.

In another possible implementation, that the control unit is configured to calculate a would-be charging current based on the current relaxation time and the present SOC of the battery includes that the control unit is further configured to calculate the would-be charging current according to a formula $I=C+K\times\tau^M(SOC)$.

In the formula, I represents the would-be charging current, $\tau$ represents the current relaxation time, SOC represents the present SOC of the battery, K is a proportionality coefficient, C is a constant greater than or equal to 0, M is an exponent coefficient, and $M\neq 0$.

A charging parameter in this application includes at least one of the constant C, the proportionality coefficient K, or the exponent coefficient M. The charging parameter is preset or is set based on a battery parameter. The battery parameter includes at least one of the present SOC of the battery, a present SOH of the battery, the current relaxation time, a present temperature of the battery, or a present SOS of the battery.

In another possible implementation, if the charging parameter is set based on the battery parameter, the control unit may further be configured to adjust the charging parameter based on the battery parameter.

In another possible implementation, the charging apparatus further includes an alarm unit. The control unit is further configured to, after determining the current relaxation time, determine, based on the current relaxation time, whether the battery ages/internally short-circuits. The alarm unit is configured to send an alarm if the control unit determines that the battery ages/internally short-circuits.

Optionally, the charging apparatus may be divided into function modules based on the charging method provided in the first aspect or any possible implementation of the first aspect. For example, each function module may be obtained through division based on each corresponding function, or two or more functions may be integrated into one processing module.

According to a third aspect, a charging apparatus is provided. The charging apparatus includes a processor and a memory. The memory is configured to store a computer executable instruction. When the charging apparatus runs, the processor executes the computer executable instruction stored in the memory, so that the charging apparatus implements the charging method in the first aspect or any possible implementation of the first aspect.

According to a fourth aspect, a control circuit is provided. The control circuit includes a processor and a memory. The memory is configured to store a computer executable instruction. When the control circuit runs, the processor executes the computer executable instruction stored in the memory, so that the control circuit implements the charging method in the first aspect or any possible implementation of the first aspect.

Optionally, the control circuit may be a chip system in the charging apparatus, and the chip system is configured to support the charging apparatus in implementing charging method provided in this application. The chip system includes a chip, or may include another discrete device or a circuit structure.

According to a fifth aspect, a computer-readable storage medium is provided. The computer-readable storage medium stores an instruction, and when the instruction is run on the charging apparatus in the third aspect, the charging apparatus is enabled to perform the method in the first aspect or any possible implementation of the first aspect.

According to a sixth aspect, a computer program product including an instruction is provided. The computer program product includes a computer executable instruction, and the computer executable instruction is read and executed by the charging apparatus in the third aspect, so that the charging apparatus implements the charging method in the first aspect or any possible implementation of the first aspect.

In this application, the implementations provided in the foregoing aspects can be further combined to provide more implementations.

DESCRIPTION OF EMBODIMENTS

Figure 1:
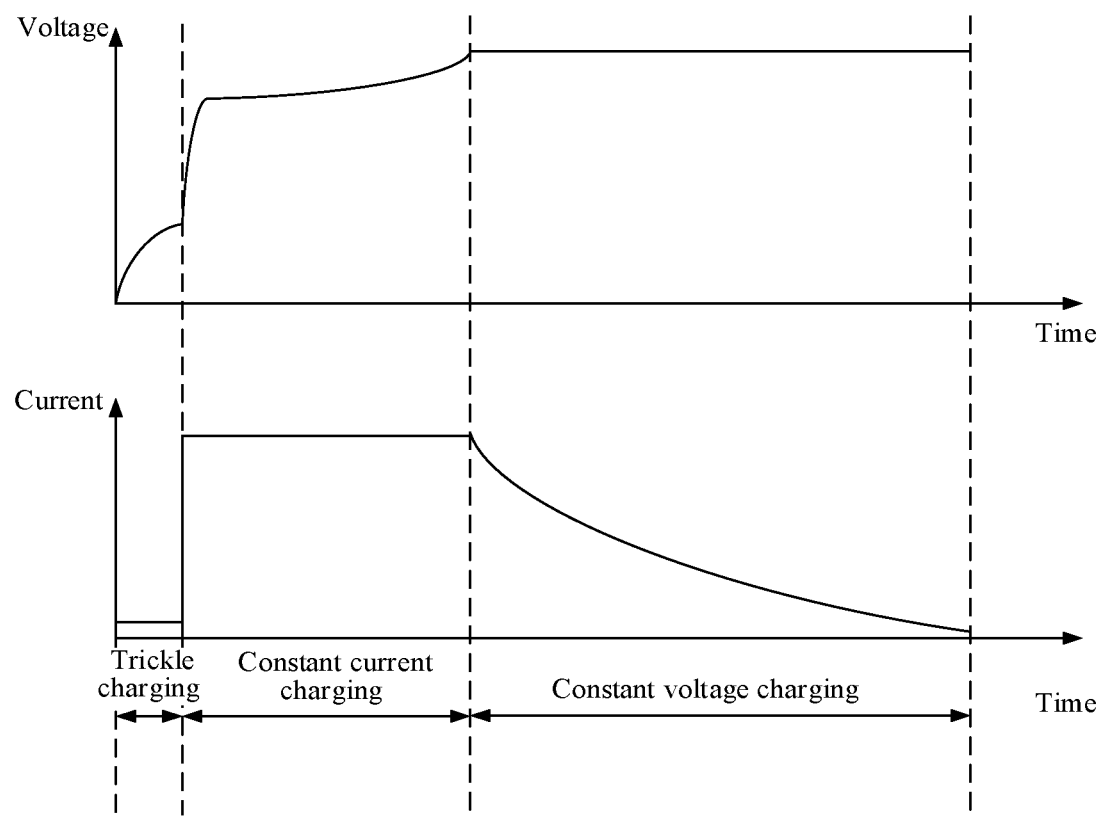
FIG. 1 is a schematic diagram of a voltage and a current of a battery in an existing charging process.

A charging method provided in embodiments of this application is described below with reference to the accompanying drawings.

Generally, batteries may be classified into a primary battery and a secondary battery. The primary battery is also referred to as a primary cell (primary battery), which is an irreversible battery that cannot be recharged after discharge. The secondary battery is also referred to as a storage battery, which is a battery that can be charged or recharged by applying a current or a voltage.

The secondary battery may be a lithium-ion battery, a lithium metal battery, a lithium polymer battery, a lithium manganese oxide battery, a lithium iron phosphate battery, a graphene lithium battery, a lead-acid battery, a nickel-cadmium battery, a nickel metal hydride battery, a lithium sulphur battery, a lithium-air battery, a sodium-ion battery, or the like.

This application centers on the secondary battery, and subsequently mentioned batteries are all representative of secondary batteries.

In addition, a battery in this application may include a single electrochemical battery unit, or may include a plurality of electrochemical battery units, or may include a battery string. This is not limited in this application.

A capacity of a battery is usually represented by "C" and measured in units of ampere-hour (Ah) or milliampere-hour (mAh). A charging current or a discharging current of a battery is expressed as C divided by a number (or multiplied by a number), and is referred to as a charging rate or a discharging rate.

For example, if a battery with a capacity of 2.0 Ah is fast charged at a constant current of 4.0 amperes (A) or 2.0×C, the battery is fully charged within a ½ hour normally.

Charging a battery refers to forcing a current into the battery as opposed to a discharging process, so as to accumulate charge and energy in the battery, convert chemical energy into electrical energy, and store the electrical energy in the battery. In this process, charging conditions, for example, parameters such as a charging voltage, a charging current, a temperature, and a cutoff voltage, need to be strictly controlled. These parameters have significant impact on cycle performance of the battery and battery life. Improper control may result in severe degradation of battery performance, scrapping of the battery, and even a disastrous accident.

For example, if a battery continues to be charged after being fully charged, the battery enters an overcharge state. This may cause a side reaction on an electrode interface of the battery and deformation of an electrode body material, and therefore causes severe degradation of battery performance.

For another example, when a battery becomes aging after a plurality of cycles of charge and discharge, resistance of the battery increases, and a charging current that can be endured by positive and negative electrode materials of the battery decreases. In this case, without an adaptive adjustment to a charging method, battery performance may degrade rapidly.

In conclusion, a charging method for a battery needs to be adaptively controlled, and an additional measure to avoid or prevent a battery safety risk is also required, to further improve cycle performance during use of the battery and battery life, and avoid or reduce an occurrence of a safety accident.

A battery is usually charged by using a staged charging method with a constant voltage and a constant current. Further, the battery is continuously charged to a potential at a constant current, and then constant voltage charging is performed on the battery at the potential.

For example, the battery is a lithium-ion battery. FIG. 1 shows a process of charging the lithium-ion battery. The charging process includes three different charging stages: a trickle charging stage, a constant current (CC) charging stage, and a constant voltage (CV) charging stage.

In the trickle charging stage, the battery is charged at a small current (generally ranging from C/20 to C/5) or by a pulse at a low duty cycle, so that an average charging current is relatively small. When a voltage of the battery reaches an end-of-precharge voltage (for example, 3.5 volts (V)), the battery enters the constant current charging stage for further charge.

The end-of-precharge voltage is a critical voltage at which the battery changes from an overdischarge state to a normal discharge state.

Generally, when left unused for a long time, the battery may be in the overdischarge state due to a self-discharge characteristic of the battery. As such, the battery is first precharged at a small current (for example, 0.01 C). After a voltage of the battery reaches the end-of-precharge voltage, the battery enters the CC stage.

Precharge activates and protects the battery. Overdischarge of the battery may cause dissolution of a solid electrolyte interface (SEI) film of a negative electrode of the battery, and may further cause decomposition of some copper on a negative electrode current collector and crystallization of a copper dendrite on a positive electrode current collector. In addition, for the lithium-ion battery, overdischarge of the battery may further cause a positive electrode material to present a semiconductive characteristic.

In the constant current charging stage, the battery is charged at a relatively large current (generally ranging from 0.7 C to 1 C), or a charging current is adjusted in a plurality of sub-stages (Multi-Stage) as more electricity is put into the battery, where a charging current in each sub-stage keeps constant. When a voltage of the battery reaches a maximum charging voltage (which may also be referred to as a charging cutoff voltage, for example, 4.4 V), the battery enters the constant voltage charging stage for further charge. The maximum charging voltage is preconfigured, and a value thereof does not change.

The maximum charging voltage is used to represent a withstand voltage of a positive electrode material, an electrolyte, or a positive electrode current collector of the battery. Further, the maximum charging voltage may be a withstand voltage common to the positive electrode material, the electrolyte, and the positive electrode current collector of the battery, or may be a withstand voltage of at least one of the positive electrode material, the electrolyte, and the positive electrode current collector of the battery. This is not limited in this embodiment of this application.

Generally, if a charging voltage is greater than the maximum charging voltage, irreversible damage may be caused to a structure of the positive electrode material of the battery, the electrolyte decomposes, and a by-product is generated, accelerating aging of the battery and causing a potential safety hazard.

In the constant voltage charging stage, the battery is charged at a constant voltage. Correspondingly, a current flowing into the battery gradually decreases as the battery is close to full charge. When the current is less than a predetermined value (for example, 0.05 C), the battery is fully charged.

According to the foregoing charging method, the charging current and the charging cutoff voltage are controlled, and a temperature, a voltage, and a current of the battery are monitored, to avoid overcharge and thermal runaway of the battery.

In the charging process, electrochemical reactions in different SOC are totally different due to comprehensive impact of a charge transfer process, a diffusion mass transfer process, an electrical double layer charging process, and an ion conduction process. In addition, after the battery is used for a period, it is inevitable that the SEI film becomes thicker, performance of the electrolyte degrades, a reaction area on an electrode surface changes, polarization impedance increases, and so on. However, an existing charging method cannot adapt to the changes, resulting in a relatively rapid increase in a temperature of the battery in the charging process, and relatively low cycle performance of the battery, and relatively short battery life.

In addition, with a continuous increase in energy density of the battery, energy in a single battery or battery unit is increasingly high. Therefore, any improper use of the battery may cause a serious or even disastrous safety accident. Among various causes of a battery safety accident, an internal short-circuit of the battery is the most covert phenomenon that is very difficult to detect and prevent in real time on site. Particularly, in the charging process, because of accumulation of electricity in the battery, the battery includes more energy. Once the internal short-circuit occurs, great harm may be caused. However, the existing charging method cannot detect and prevent the internal short-circuit.

In view of the foregoing problems, a charging method and apparatus are provided in the embodiments of this application. In a process of charging a battery at a constant voltage that is greater than an end-of-precharge voltage of the battery and less than a maximum charging voltage of the battery, the charging apparatus determines a current relaxation time in the charging process, and adjusts a charging current and a charging voltage based on the current relaxation time, to adaptively charge the battery.

The current relaxation time refers to duration of a current relaxation process. In a constant voltage charging stage, a charging current decreases exponentially. This process is referred to as the current relaxation process. In a charging process, a charging current changes with the passage of time, and the change of the charging current corresponds to a change of an electrochemical reaction rate on an electrode surface of a battery. Accordingly, the current relaxation time may reflect the change of the electrochemical reaction rate in the battery.

Because the current relaxation time may reflect the change of the electrochemical reaction rate in the battery, the charging apparatus adjusts the charging current and the charging voltage based on the current relaxation time. This can better adapt to a change inside the battery in the charging process, improve safety and reliability of the battery in the charging process, effectively enhance cycle performance of the battery, and effectively prolong battery life.

In addition, in the charging process, the charging apparatus may further determine, based on a value of the current relaxation time, whether the battery ages or internally short-circuits, and this effectively reduces an occurrence of a safety accident.

The charging method provided in this application is mainly applied to the constant current charging stage shown in FIG. 1. In other words, this application is mainly an improvement to a charging method in the second stage. Certainly, the charging method provided in this application may also be applied to the trickle charging stage and the constant voltage charging stage shown in FIG. 1.

Subsequently, an example in which the charging method provided in this application is applied to the trickle charging stage shown in FIG. 1 is used for description.

The charging method provided in this embodiment of this application is applicable to charging devices without a rechargeable battery, for example, an electric vehicle charging pile, a mobile phone universal charger, and the like, or may be applicable to various charging devices with a rechargeable battery, for example, a tablet computer, a smartphone, a portable computer, a camera, a game console, a small computer, a laptop computer, a smartwatch, a wearable accessory, an electric vehicle, and the like.

The charging apparatus in this embodiment of this application may be any one of the foregoing charging devices, or may be some apparatuses in the any one of the foregoing charging devices. For example, the charging apparatus may be a chip system in the smartphone, where the chip system is configured to support the smartphone in implementing the charging method provided in this embodiment of this application. The chip system includes a chip, or may include another discrete device or a circuit structure.

Figure 2:
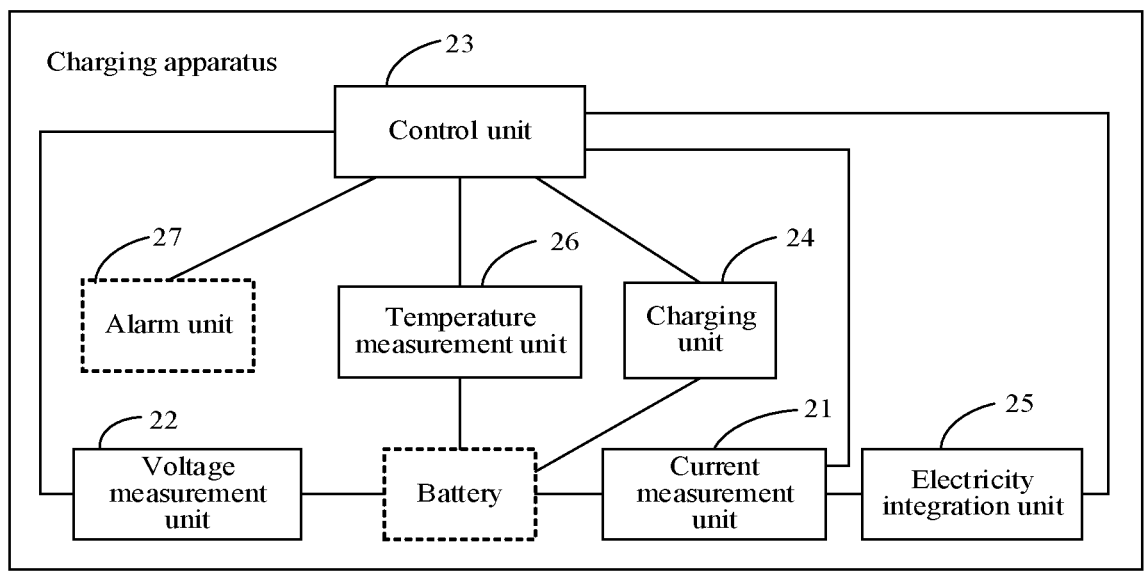
FIG. 2 is a schematic structural diagram of a charging apparatus according to an embodiment of this application.

For example, as shown in FIG. 2, a charging apparatus in an embodiment of this application includes a current measurement unit 21, a voltage measurement unit 22, a control unit 23, a charging unit 24, an electricity integration unit 25, and a temperature measurement unit 26.

The current measurement unit 21 is configured to measure a charging current of a battery, and may be implemented by an ampere meter. In this embodiment of this application, for a specific design and implementation of the ampere meter, refer to a design and implementation of any ampere meter configured to measure a current in other approaches. This is not limited in this embodiment of this application.

The current measurement unit 22 is configured to measure a charging current of the battery, and may be implemented by a voltmeter. In this embodiment of this application, for a specific design and implementation of the voltmeter, refer to a design and implementation of any voltmeter configured to measure a voltage in other approaches. This is not limited in this embodiment of this application.

The control unit 23 is configured to calculate a current relaxation time based on data measured by the current measurement unit 21, the voltage measurement unit 22, and the temperature measurement unit 26, determine, based on the current relaxation time, a charging current and a charging voltage that are to be input to the battery, and output a corresponding control signal to the charging unit 24. Optionally, if the current input to the battery keeps constant but the voltage input to the battery changes, the control unit 23 may send, to the charging unit 24, a control signal used to indicate constant current charging. If the voltage input to the battery keeps constant but the current input to the battery changes, the control unit 23 may send, to the charging unit 24, a control signal used to indicate constant voltage charging.

In addition, the control unit 23 may be further configured to determine, based on the calculated current relaxation time, whether the battery ages/internally short-circuits.

The charging unit 24 is configured to provide a controllable constant charging current or a controllable constant charging voltage for the battery based on the control signal sent by the control unit 23.

The electricity integration unit 25 is configured to calculate, based on the charging current, a quantity of electricity accumulated in the battery, in other words, determine an SOC of the battery.

The temperature measurement unit 26 is configured to measure a temperature of the battery, and may be implemented by a heat sensor. In this embodiment of this application, for a specific design and implementation of the heat sensor, refer to a design and implementation of any heat sensor configured to measure a temperature in other approaches. This is not limited in this embodiment of this application. In actual application, the temperature of the battery affects the current relaxation time.

Optionally, the charging apparatus further includes an alarm unit 27. If the control unit 23 determines, based on the calculated current relaxation time, that the battery ages/internally short-circuits, the alarm unit 27 gives an alarm.

Optionally, the charging apparatus further includes the battery.

Because both the battery and the alarm unit 27 are optional, the battery and the alarm unit 27 are marked by using dashed boxes in FIG. 2.

The foregoing units are obtained through division according to functions implemented by the units. Alternatively, the foregoing two or more units may be integrated into one processing unit. The foregoing units may be implemented in a form of hardware, or may be implemented in a form of a software function module.

It should be noted that FIG. 2 is an example of the charging apparatus in this embodiment of this application, and is merely logical function division. In actual implementation, there may be another division manner.

In hardware implementation, the current measurement unit 21 may be an ampere meter in the charging apparatus, the voltage measurement unit 22 may be a voltmeter in the charging apparatus, the control unit 23 and the electricity integration unit 25 may be implemented by a processor or by the processor invoking a program in a cache, the charging unit 24 may be a controlled power supply in the charging apparatus, the temperature measurement unit 26 may be a heat sensor in the charging apparatus, and the alarm unit 27 may be a display or an alarm indicator of the charging apparatus.

With reference to the charging apparatus shown in FIG. 2, the following describes in detail a charging method provided in an embodiment of this application.

Figure 3:
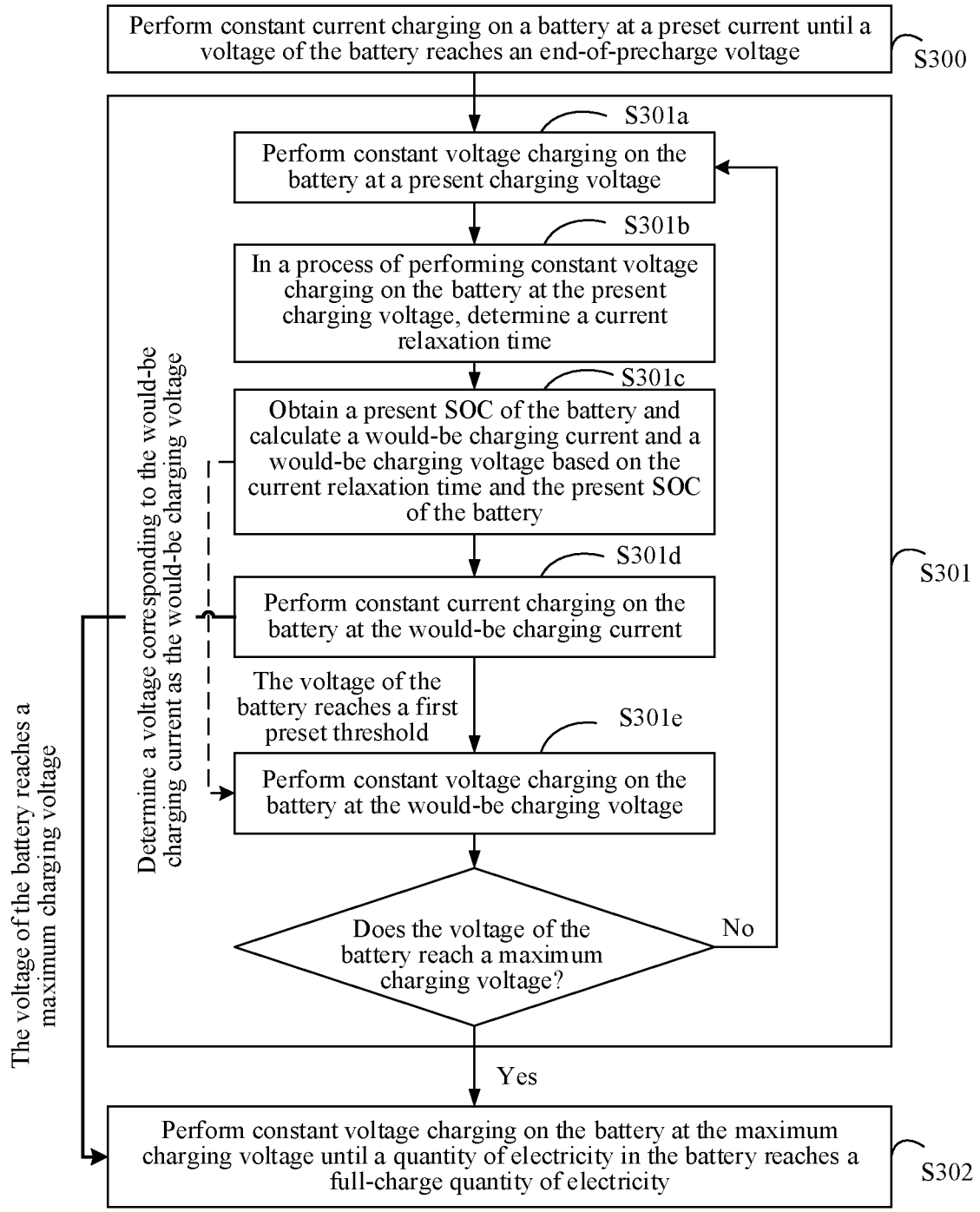
FIG. 3 is a first schematic flowchart of a charging method according to an embodiment of this application.

Referring to FIG. 3, the charging method includes the following steps.

S300. A charging apparatus performs constant current charging on a battery at a preset current until a voltage of the battery reaches an end-of-precharge voltage.

Further, in a constant current charging process, a voltage measurement unit in the charging apparatus measures the voltage of the battery in this process in real time. This process ends when the voltage measurement unit detects that the voltage of the battery reaches the end-of-precharge voltage.

For example, the end-of-precharge voltage is 3.5 V. The charging apparatus performs constant current charging on the battery at a current of C/20 until the voltage of the battery reaches 3.5 V.

This stage is a first stage in which the charging apparatus charges the battery, and the stage is equivalent to the trickle charging stage in FIG. 1.

After the voltage of the battery reaches the end-of-precharge voltage, the charging apparatus continues to perform S301. S301 is equivalent to a second stage (for example, the constant current charging stage shown in FIG. 1) in which a charging apparatus charges a battery in other approaches.

S301. The charging apparatus performs constant voltage charging on the battery at different charging voltages in different time periods until the voltage of the battery reaches a maximum charging voltage, or the charging apparatus performs constant voltage charging and constant current charging until the voltage of the battery reaches the maximum charging voltage.

Optionally, after performing S300, the charging apparatus may charge the battery only in a constant voltage charging manner (different charging voltages are used in different time periods), or may charge the battery in a hybrid manner of constant voltage charging and constant current charging (for example, constant voltage charging alternates with constant current charging, or m (m≥2) times of constant voltage charging are performed after constant current charging, or the like). This is not limited in this embodiment of this application.

Regardless of which manner is used by the charging apparatus to charge the battery, in each constant voltage charging process, the charging apparatus determines a current relaxation time and determines a would-be charging current based on the current relaxation time and a present SOC of the battery. Subsequently, the charging apparatus performs constant current charging on the battery at the would-be charging current. Alternatively, the charging apparatus determines a voltage corresponding to the would-be charging current as a would-be charging voltage, and charges the battery at the would-be charging voltage.

Further, the charging process described in S301 may be represented by S301*a* to S301*e* below. S301*a* to S301*e* are described now.

S301*a*. The charging apparatus performs constant voltage charging on the battery at a present charging voltage.

The present charging voltage is greater than the end-of-precharge voltage and less than the maximum charging voltage.

The charging apparatus in this embodiment of this application may perform a plurality of times of constant voltage charging on the battery. The charging apparatus uses different charging voltages in different constant voltage charging processes. The present charging voltage is a charging voltage used by the charging apparatus in a present constant voltage charging process.

Figure 6:
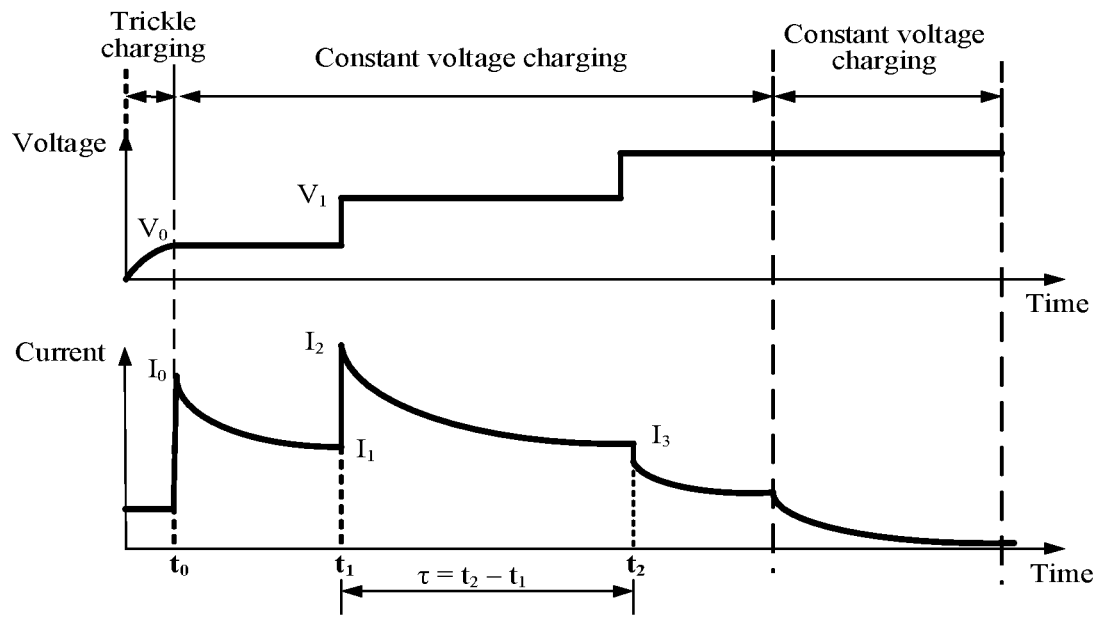
FIG. 6 is a first schematic diagram of variations in a voltage and a current of a battery according to an embodiment of this application.

For example, as shown in FIG. 6, in a time period from $t_0$ to $t_1$, the charging apparatus performs constant voltage charging on the battery at a voltage of $V_0$. In this case, the present charging voltage is $V_0$. In a time period from $t_1$ to $t_2$, the charging apparatus performs constant voltage charging on the battery at a voltage of $V_1$. In this case, the present charging voltage is $V_1$.

S301*b*. In a process of performing constant voltage charging on the battery at the present charging voltage, the charging apparatus determines a current relaxation time.

The current relaxation time herein refers to duration of a current relaxation process. The current relaxation process is a process in which a charging current decreases exponentially in a constant voltage charging stage.

Generally, a value of the current relaxation time varies with an SOC of the battery, an SOH of the battery, an SOS of the battery, a temperature of the battery, or the like.

In the process of performing constant voltage charging on the battery at the present charging voltage, in this embodiment of this application, a time period from a moment at which a peak value of a charging current occurs to a moment at which a value of the charging current is a second preset threshold or a change rate of the charging current is less than a preset change rate is considered as the current relaxation time. Certainly, the charging apparatus may alternatively determine the current relaxation time in another manner. This is not limited in this embodiment of this application.

For example, the charging apparatus determines a first moment and a second moment, to determine the current relaxation time. The first moment is a moment at which the peak value of the charging current occurs in the process of performing constant voltage charging on the battery at the present charging voltage, the second moment is a moment at which the value of the charging current is the second preset threshold or the change rate of the charging current is less than or equal to a preset change rate in the process of performing constant voltage charging on the battery at the present charging voltage. The first moment is earlier than the second moment.

As shown in FIG. 6, in a constant voltage charging process of the battery at the charging voltage $V_1$, a peak value $I_2$ of the charging current occurs at the moment $t_1$, and a change rate of the charging current at the moment $t_2$ is less than the preset change rate. In this case, duration from the moment $t_1$ to the moment $t_2$ is determined as the current relaxation time τ. In other words, $\tau = t_2 - t_1$.

In this embodiment of this application, values of the second preset threshold and the preset change rate may be preconfigured based on a requirement.

Figure 7:
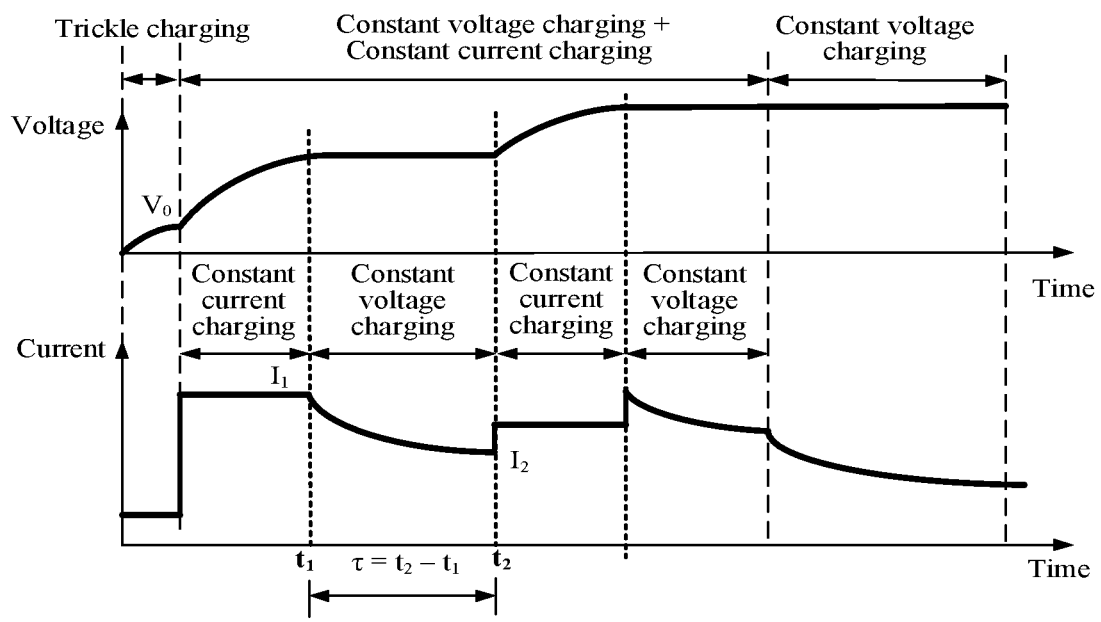
FIG. 7 is a second schematic diagram of variations in a voltage and a current of a battery according to an embodiment of this application.
Figure 8:
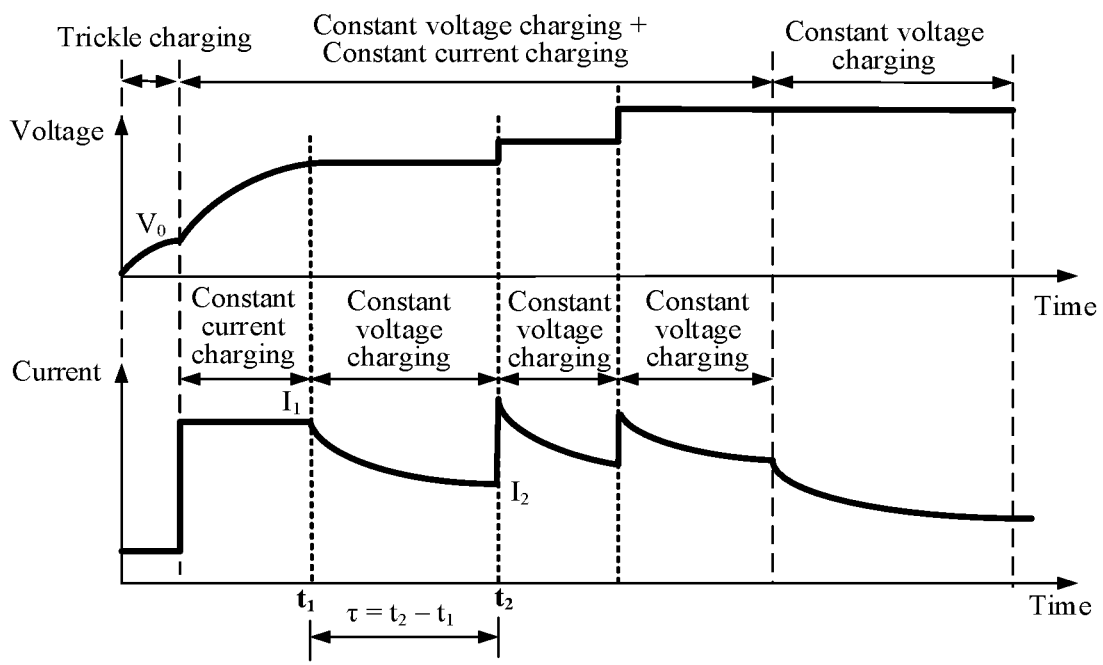
FIG. 8 is a third schematic diagram of variations in a voltage and a current of a battery according to an embodiment of this application.
Figure 9:
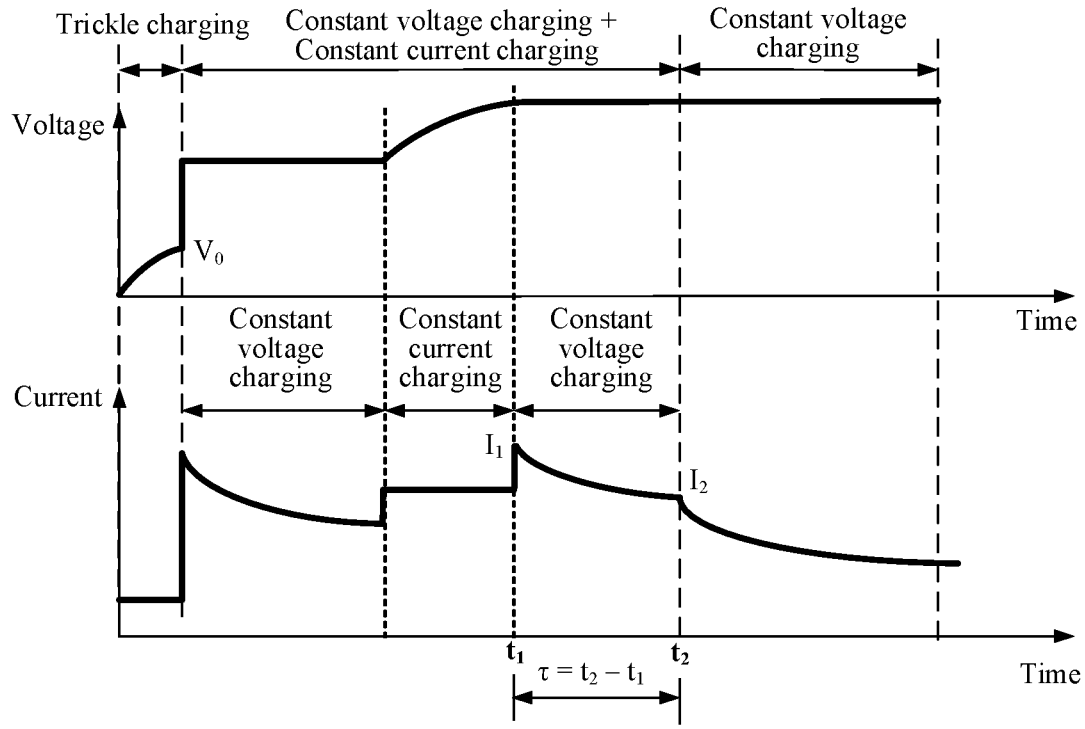
FIG. 9 is a fourth schematic diagram of variations in a voltage and a current of a battery according to an embodiment of this application.

Similarly, FIG. 7, FIG. 8, and FIG. 9 each also show a current relaxation time τ in a constant voltage charging process. A principle for calculating the current relaxation time is basically the same. Therefore, the current relaxation time τ in each of FIG. 7, FIG. 8, and FIG. 9 is not described herein again.

S301*c*. The charging apparatus obtains a present SOC of the battery and calculates the would-be charging current based on the current relaxation time and the present SOC of the battery.

The present SOC of the battery is an SOC of the battery at a moment when the current relaxation time starts. With reference to FIG. 6, in the process of performing constant voltage charging on the battery at the charging voltage $V_1$, the present SOC of the battery is an SOC of the battery at the moment $t_1$.

Optionally, the charging apparatus may convert a voltage into an SOC of the battery according to a curve of an SOC versus a charging/discharging voltage, to obtain the present SOC of the battery, or may integrate the charging current, to obtain the present SOC of the battery. Alternatively, the charging apparatus may use another technical means to determine the present SOC of the battery. This is not limited in this embodiment of this application.

After obtaining the present SOC of the battery and the current relaxation time, the charging apparatus calculates the would-be charging current and the would-be charging voltage.

In an example, the charging apparatus calculates the would-be charging current I according to the following formula:

$$I = C + K \times \tau^M (SOC). \quad (1)$$

In the formula (1), $\tau$ represents the current relaxation time, SOC represents the present SOC of the battery, K is a proportionality coefficient, C is a constant greater than or equal to 0, M is an exponent coefficient, and M≠0.

A charging parameter includes at least one of the constant C, the proportionality coefficient K, or the exponent coefficient M. A value of the charging parameter may be preset (that is, is a fixed value), or may be set based on a battery parameter (that is, varies depending on the battery parameter).

Herein, the battery parameter includes at least one of the present SOC of the battery, a present SOH of the battery, the current relaxation time, a present temperature of the battery, or a present SOS of the battery.

When values of the constant C, the proportionality coefficient K, and the exponent coefficient M all are fixed values, the charging apparatus may adaptively adjust the would-be charging current I according to the formula (1) based on the current relaxation time $\tau$ and a change of the present SOC of the battery.

When the value of the charging parameter varies depending on the battery parameter, the charging apparatus adjusts the value of the charging parameter based on a change of the battery parameter, and then adaptively adjusts the charging current based on an adjusted charging parameter.

In an optional implementation, the value or a value range of the charging parameter depends on a temperature of the battery.

For example, when the temperature of the battery is lower than a normal temperature (for example, 25° C.), a diffusion rate of a lithium-ion battery that uses graphite as a negative electrode material is relatively small. In this case, the charging apparatus may charge the battery at a relatively small charging current. When the temperature of the battery is higher than a normal temperature (for example, 25° C.), a diffusion rate of a lithium-ion battery that uses graphite as a negative electrode material is relatively large. In this case, the charging apparatus may charge the battery at a relatively large charging current.

Accordingly, the charging apparatus may adjust the value and/or the value range of the charging parameter based on the temperature of the battery.

In another optional implementation, the value or a value range of the charging parameter depends on the present SOC of the battery.

For example, a lithium-ion secondary battery uses lithium cobalt oxide as a positive electrode material. When the present SOC of the battery is less than 50%, a diffusion rate of a lithium ion deintercalated from a lithium cobalt oxide material is relatively large. In this case, the charging apparatus may charge the battery at a relatively large charging current. When the present SOC of the battery is greater than 50%, a diffusion rate of a lithium ion deintercalated from a lithium cobalt oxide material is relatively small. In this case, the charging apparatus may charge the battery at a relatively small charging current.

Accordingly, the charging apparatus may adjust the value and/or the value range of the charging parameter based on the present SOC of the battery.

In another optional implementation, the value or a value range of the charging parameter depends on the present SOH of the battery.

Figure 4:
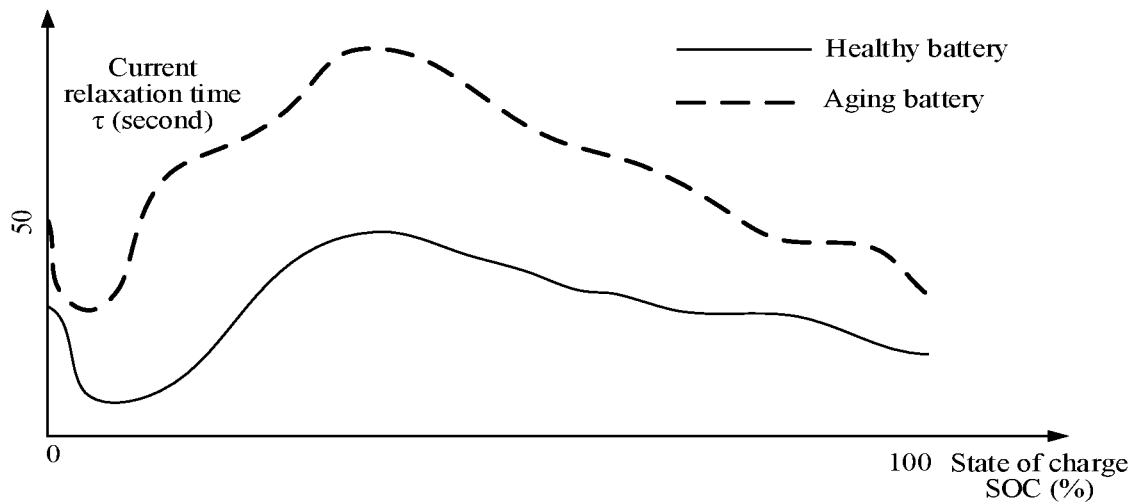
FIG. 4 is a schematic diagram of a relationship between a current relaxation time and a battery SOH according to an embodiment of this application.

For example, a method for obtaining the present SOH of the battery by the charging apparatus is as follows. The charging apparatus measures the current relaxation time $\tau$ of the battery, and obtains a variation curve of the current relaxation time $\tau$ (as shown in FIG. 4). Then, the charging apparatus compares variation values of a current relaxation time $\tau$ of a healthy battery and a current relaxation time $\tau$ of an aging battery in a same SOC, to determine the present SOH of the battery.

After determining the present SOH of the battery, the charging apparatus may adaptively adjust the charging parameter based on the present SOH of the battery.

In another optional implementation, the value or a value range of the charging parameter depends on the present SOS of the battery.

Figure 5:
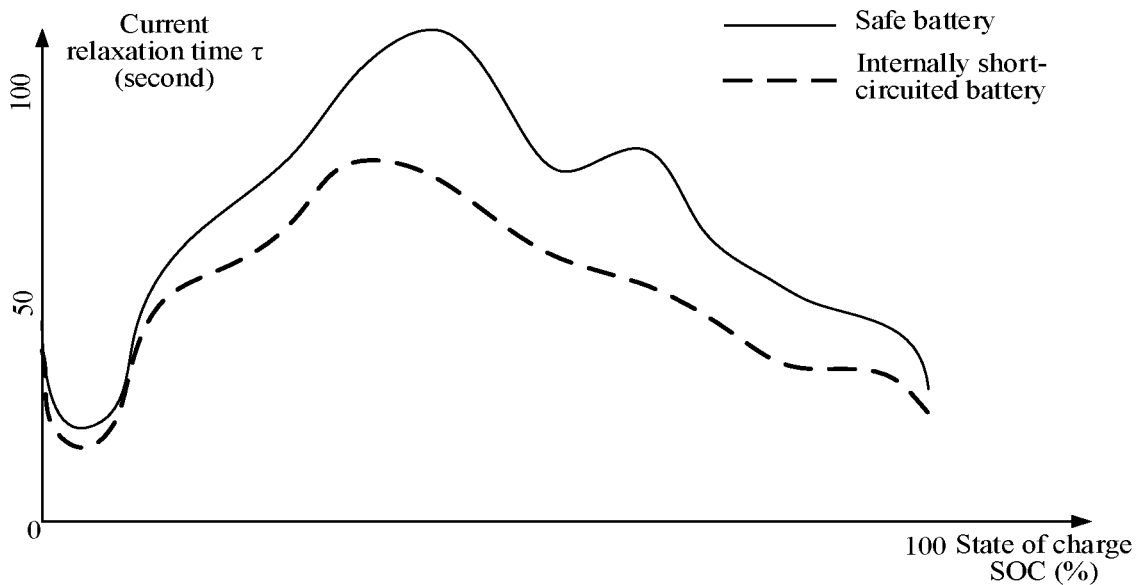
FIG. 5 is a schematic diagram of a relationship between a current relaxation time and a battery SOS according to an embodiment of this application.

For example, a method for obtaining the present SOS of the battery by the charging apparatus is as follows. A method for obtaining the present SOS of the battery by the charging apparatus is as follows. The charging apparatus measures the current relaxation time $\tau$ of the battery, and obtains a variation curve of the current relaxation time $\tau$ (as shown in FIG. 5). Then, the charging apparatus compares variation values of a current relaxation time $\tau$ of a healthy battery and a current relaxation time $\tau$ of an internally short-circuited battery in a same SOC, to determine the present SOS of the battery.

The SOS of the battery affects a value change of the charging parameter to some extent. For example, when a micro short-circuit occurs in the battery, a self-discharge rate of the battery increases, and an internal diffusion path, for example, an electrode reaction area, of the battery changes. Finally, this causes a change of electrode kinetic behavior of the battery, and accordingly, the value of the charging parameter changes.

After determining the present SOS of the battery, the charging apparatus may adaptively adjust the charging parameter based on the present SOS of the battery.

In another example, the charging apparatus calculates the would-be charging current I according to the following formula:

$$I = C + K \times (1 + \tau(SOC) + \tau^2(SOC) + \ldots + \tau^N(SOC)). \quad (2)$$

In the formula (2), $\tau$ represents the current relaxation time, SOC represents the present SOC of the battery, K is a proportionality coefficient, C is a constant greater than or equal to 0, N is a polynomial coefficient, and N≠0.

In a scenario in which the charging apparatus calculates the would-be charging current according to the formula (2), a charging parameter includes at least one of the constant C, the proportionality coefficient K, or the polynomial coefficient N. Similarly, a value of the charging parameter may be a fixed value, or may vary with a battery parameter.

It should be noted that the formula (1) and the formula (2) are merely examples for describing "the charging apparatus calculates the would-be charging current based on the current relaxation time and the present SOC of the battery" in this embodiment of this application, and do not constitute a limitation on a method for calculating the would-be charging current by the charging apparatus. In addition to the formula (1) and the formula (2), another formula may be used to calculate the would-be charging current.

After performing S301c, the charging apparatus performs S301d or S301e.

It should be noted that, in actual application, the charging apparatus may perform S301d or S301e after S301c based on configuration or an actual requirement.

If a next charging stage is a constant current charging stage, the charging apparatus directly performs constant current charging at the calculated would-be charging current. In other words, S301d is performed.

If a next charging stage is a constant voltage charging stage, after determining the would-be charging current, the charging apparatus raises a voltage stepwise, so that a charging current reaches the would-be charging current. Correspondingly, the charging apparatus determines a voltage (which corresponds to the would-be charging current) at this moment as the would-be charging voltage, and performs constant voltage charging on the battery at the would-be charging voltage. In other words, S301e is performed.

S301d. The charging apparatus performs constant current charging on the battery at the would-be charging current.

It is easily to understand that in a constant current charging process, the voltage of the battery increases with passage of time.

If the voltage of the battery reaches a first preset threshold (a voltage of the first preset threshold is less than the maximum charging voltage) in the constant current charging process, the charging apparatus determines the voltage of the first preset threshold as the would-be charging voltage, and performs the following S301e. Herein, the first preset threshold is a preconfigured voltage. In actual application, the first preset threshold may be preconfigured based on a requirement.

If the voltage of the battery reaches the maximum charging voltage in the constant current charging process, the charging apparatus performs S302.

S301e. The charging apparatus performs constant voltage charging on the battery at the would-be charging voltage.

In a process in which the charging apparatus performs constant voltage charging on the battery at the would-be charging voltage, the would-be charging voltage is the present charging voltage. If the would-be charging voltage is less than the maximum charging voltage, the charging apparatus repeats S301a, S301b, and S301c in the constant voltage charging process until the would-be charging voltage reaches the maximum charging voltage.

If the would-be charging voltage reaches the maximum charging voltage, the charging apparatus performs S302.

In conclusion, the charging apparatus may perform S301d or S301e after S301c. Therefore, if the battery is charged by using the charging method provided in this embodiment of this application, a respective graph of a current and a voltage of the battery may be shown in FIG. 6, or FIG. 7, or FIG. 8, or FIG. 9.

Certainly, each of FIG. 6 to FIG. 9 is merely an example of a respective graph of a current and a voltage of the battery when the battery is charged by using the charging method provided in this embodiment of this application, and does not constitute a limitation on a respective graph of a current and a voltage of the battery.

As shown in FIG. 6, after the voltage of the battery reaches the end-of-precharge voltage (for example, $V_0$), the charging apparatus performs constant voltage charging on the battery at different charging voltages in different time periods until the charging voltage reaches the maximum charging voltage. In each constant voltage charging stage, a value of the charging current decreases. The charging apparatus determines a current relaxation time in this stage, then calculates a would-be charging current in a next charging stage based on the current relaxation time, and determines a would-be charging voltage based on the would-be charging current.

As shown in FIG. 7, after the voltage of the battery reaches the end-of-precharge voltage (for example, $V_0$), the charging apparatus performs constant voltage charging and constant current charging alternately on the battery until the charging voltage reaches the maximum charging voltage.

As shown in FIG. 8, after the voltage of the battery reaches the end-of-precharge voltage (for example, $V_0$), the charging apparatus first performs constant current charging on the battery and then performs constant voltage charging on the battery until the charging voltage reaches the maximum charging voltage.

As shown in FIG. 9, after the voltage of the battery reaches the end-of-precharge voltage (for example, $V_0$), the charging apparatus first performs constant voltage charging on the battery and then charges the battery in a hybrid manner of constant current charging and constant voltage charging until the charging voltage reaches the maximum charging voltage.

For FIG. 7, FIG. 8, and FIG. 9, in each constant voltage charging stage, a value of the charging current decreases. The charging apparatus determines a current relaxation time in the stage, and then calculates a would-be charging current in a next charging stage based on the current relaxation time. In each constant current charging stage, after a voltage of the battery reaches a threshold, the charging apparatus performs constant voltage charging on the battery at a voltage whose value is equal to the threshold.

It should be noted that a quantity of times of constant current charging or constant voltage charging performed by the charging apparatus is not limited in this embodiment of this application. FIG. 6 to FIG. 9 are merely examples of a charging process, and do not constitute a limitation on the charging process.

In actual application, a quantity of times of constant current charging or constant voltage charging performed by the charging apparatus needs to be determined based on a requirement or based on configuration.

Optionally, in a process in which the charging voltage changes from the end-of-precharge voltage to the maximum charging voltage, the charging apparatus may monitor, measure, and calculate the current relaxation time by using time T, a present SOC of the battery, or a voltage of the battery as a unit, to adjust the would-be charging current and the would-be charging voltage.

S302. The charging apparatus performs constant voltage charging on the battery at the maximum charging voltage until a quantity of electricity in the battery reaches a full-charge quantity of electricity.

The full-charge quantity of electricity is a quantity of electricity when the battery is fully charged.

Because the charging voltage reaches the maximum charging voltage, the charging apparatus cannot change the charging voltage. In a process in which the charging apparatus performs constant voltage charging on the battery at the maximum charging voltage, the charging current decreases with passage of time. When the current is less than a preset value (for example, 0.05 C), it is determined that a quantity of electricity in the battery reaches the full-charge quantity of electricity, and the charging process of the battery ends.

A change of the charging current corresponds to a change of an electrochemical reaction rate in the battery. Therefore, the current relaxation time may reflect the change of the electrochemical reaction rate in the battery. In this embodiment of this application, the charging apparatus adjusts the charging current and the charging voltage based on the current relaxation time. This can better adapt to a change inside the battery in the charging process, effectively improve safety and reliability of the battery in the charging process, enhance cycle performance of the battery, and prolong battery life.

For example, when the current relaxation time is greater than a threshold, the charging apparatus increases the would-be charging current. When the current relaxation time is less than the threshold, the charging apparatus reduces the would-be charging current, and further controls a charging speed. This effectively improves cycle performance of the battery and prolongs battery life.

In addition, in the charging process, after calculating the current relaxation time, the charging apparatus in this embodiment of this application may further determine, based on the calculated current relaxation time, whether the battery ages or internally short-circuits, to improve safety of the battery and prolong battery life.

Figure 10:
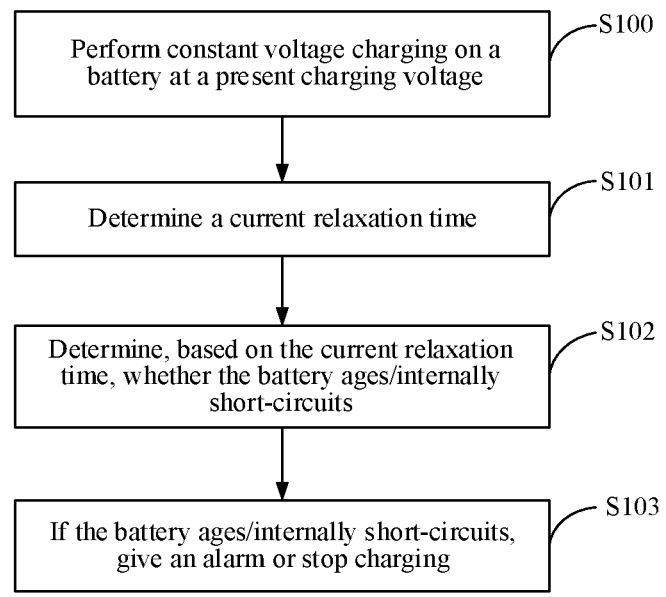
FIG. 10 is a second schematic flowchart of a charging method according to an embodiment of this application.

As shown in FIG. 10, a charging method provided in an embodiment of this application includes the following steps.

S100. A charging apparatus performs constant voltage charging on a battery at a present charging voltage.

For S100, refer to S301a.

S101. In a process of performing constant voltage charging on the battery at the present charging voltage, the charging apparatus determines a current relaxation time.

For S101, refer to S301b.

S102. The charging apparatus determines, based on the current relaxation time, whether the battery ages/internally short-circuits.

Optionally, the charging apparatus obtains a present SOC of the battery, compares the calculated current relaxation time with a current relaxation time of a battery in a healthy state in the present SOC, and determines, based on a comparison result, whether the battery ages/internally short-circuits.

In an example, it may be learned with reference to FIG. 4 that, for a same SOC, if the "calculated current relaxation time" is greater than the "current relaxation time of the battery in the healthy state in the present SOC", and a difference thereof is greater than a threshold (for example, a threshold 1), it is determined that the battery ages.

In another example, it may be learned with reference to FIG. 5 that, for a same SOC, a value of a current relaxation time of an internally short-circuited battery is less than or equal to a current relaxation time of a safe battery. Therefore, for a same SOC, if the "calculated current relaxation time" is less than the "current relaxation time of the battery in the healthy state in the present SOC", and a difference thereof is greater than a threshold (for example, a threshold 2), it is determined that the battery internally short-circuits.

S103. If the battery ages/internally short-circuits, the charging apparatus gives an alarm or stops charging.

It can be learned that the charging apparatus may determine, based on the current relaxation time, whether the battery ages/internally short-circuits in a charging process. This effectively improves safety and reliability of the battery in the charging process.

It is easily to understood that, if the battery does not age/internally short-circuit, the charging apparatus charges the battery by using the charging method shown in FIG. 3.

In conclusion, the charging method provided in this embodiment of this application effectively improves safety and reliability of the battery in the charging process, enhances cycle performance of the battery, and prolongs battery life.

An embodiment of this application provides a charging apparatus. The charging apparatus may be various charging devices, or may be some apparatuses in the charging device. For example, the charging apparatus may be a chip system in the charging device. Optionally, the chip system is configured to support the charging device in implementing functions in the foregoing method embodiments, for example, determining data and/or information in the foregoing methods. The chip system includes a chip, or may include another discrete device or a circuit structure.

The charging apparatus is configured to perform the steps performed by the charging apparatus in the foregoing charging methods. The charging apparatus provided in this embodiment of this application may include modules corresponding to corresponding steps.

In this embodiment of this application, the charging apparatus may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. In this embodiment of this application, module division is an example, and is merely a logical function division. In actual implementation, there may be another division manner.

When each function module is obtained through division based on each corresponding function, FIG. 2 is a possible schematic structural diagram of the charging apparatus in this embodiment of this application.

Figure 11:
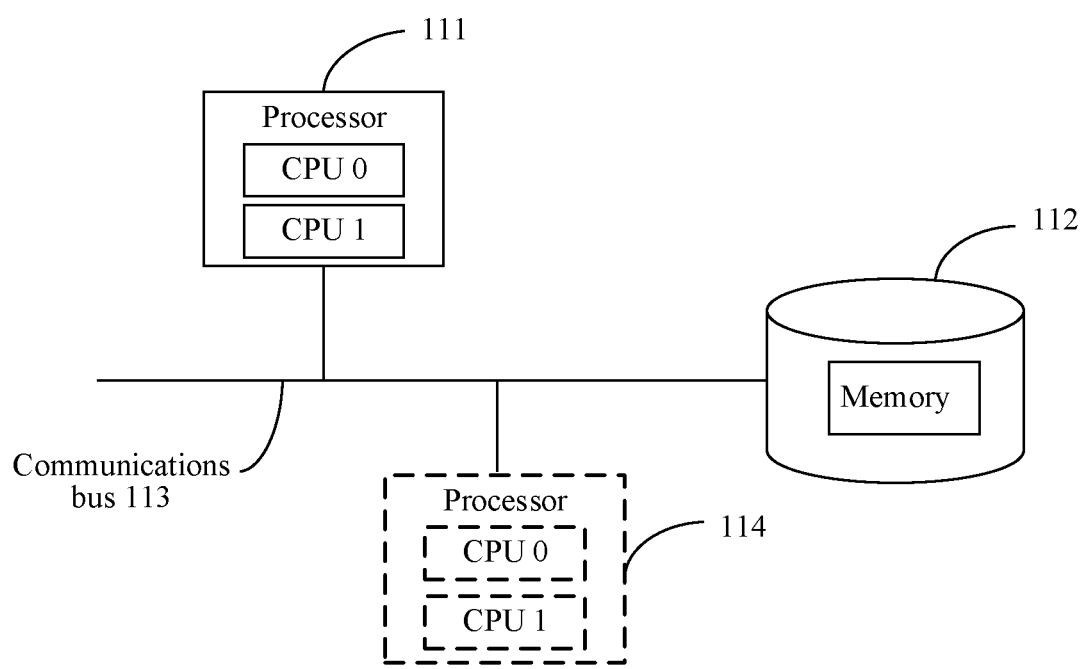
FIG. 11 is a schematic diagram of a hardware structure of a charging apparatus according to an embodiment of this application.

In hardware implementation, FIG. 11 is a schematic diagram of composition of the charging apparatus provided in this embodiment of this application. As shown in FIG. 11, the charging apparatus may include at least one processor 111, a memory 112, and a communications bus 113. The following describes each constituent part of the charging apparatus in detail with reference to FIG. 11.

The processor 111 is a control center of the charging apparatus, and may be one processor or may be a collective term of a plurality of processing elements. For example, the processor 111 may be a central processing unit (CPU), or may be an application-specific integrated circuit (ASIC), or one or more integrated circuits configured to implement this embodiment of this application, for example, one or more digital signal processors (DSPs) or one or more field-programmable gate arrays (FPGAs).

The processor 111 may execute various functions of the charging apparatus by running or executing a software program stored in the memory 112 and calling data stored in the memory 112.

In specific implementation, in an embodiment, the processor 111 may include one or more CPUs, for example, a CPU 0 and a CPU 1 shown in FIG. 11.

In specific implementation, in an embodiment, the charging apparatus 1100 may include a plurality of processors, for example, the processor 111 and a processor 114 in FIG. 11. Each of the processors may be a single-core (single-CPU) processor, or may be a multi-core (multi-CPU) processor. The processor herein may refer to one or more devices, circuits, and/or processing cores configured to process data (for example, a computer program instruction).

The memory 112 may be a read-only memory (ROM), another type of static storage device that can store static information and an instruction, a random-access memory (RAM), or another type of dynamic storage device that can store information and an instruction, or may be an electrically erasable programmable ROM (EEPROM), a compact disc (CD) ROM (CD-ROM) or another CD storage, an optical disc storage (including a compact disc, a laser disc, an optical disc, a DIGITAL VERSATILE DISC (DVD), a BLU-RAY disc, or the like), a magnetic storage medium or another magnetic storage device, or any other medium that can be used to carry or store expected program code in a form of an instruction or a data structure and that can be accessed by a computer. However, this is not limited thereto. The memory 112 may exist independently, and is connected to the processor 111 by using the communications bus 113. Alternatively, the memory 112 may be integrated into the processor 111.

The memory 112 is configured to store a software program that performs the solution of this application, and the processor 111 controls execution of the software program.

The communications bus 113 may be an Industry Standard Architecture (ISA) bus, a Peripheral Component Interconnect (PCI) bus, an Extended ISA (EISA) bus, or the like. The bus may be classified into an address bus, a data bus, a control bus, and the like. For ease of representation, only one thick line is used to represent the bus in FIG. 11, but this does not mean that there is only one bus or only one type of bus.

It should be noted that a structure of the device shown in FIG. 11 does not constitute a limitation on the charging apparatus. In addition to the components shown in FIG. 11, the charging apparatus may include more or fewer components than those shown in the figure, or combine some components, or have different component arrangements.

For example, the charging apparatus provided in this embodiment of this application may further include at least one of a communications interface, a controlled power supply, an ampere meter, a voltmeter, or a heat sensor. The communications interface is configured to provide a charging port for a battery, the controlled power supply is configured to provide a constant-voltage power supply or a constant-current power supply for a current, the ampere meter is configured to measure a charging current, the voltmeter is configured to measure a charging voltage, and the heat sensor is configured to measure a temperature of the battery.

Another embodiment of this application further provides a computer-readable storage medium. The computer-readable storage medium stores an instruction, and when the instruction is run on a charging apparatus, the charging apparatus implements the charging method shown in FIG. 3 or FIG. 10.

Another embodiment of this application further provides a computer program product including an instruction. The computer program product includes a computer executable instruction, and the computer executable instruction is read and executed by a charging device, so that a charging apparatus implements the charging method shown in the embodiment in FIG. 3 or FIG. 10.

An embodiment of this application further provides a control circuit. The control circuit includes a processor and a memory. The memory is configured to store a computer executable instruction. When the control circuit runs, the processor executes the computer executable instruction stored in the memory, so that the control circuit implements the charging method shown in the embodiment in FIG. 3 or FIG. 10.

With reference to FIG. 2, the control circuit may correspond to the control unit 23 in FIG. 2.

For example, the control circuit is a chip system in a charging apparatus. Optionally, the chip system is configured to support the charging apparatus in implementing functions in the foregoing method embodiments, for example, determining data and/or information in the foregoing methods. The chip system includes a chip, or may include another discrete device or a circuit structure.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data terminal, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD), or the like.

The foregoing descriptions about implementations allow a person skilled in the art to understand that, for the purpose of convenient and brief description, division of the foregoing function modules is used as an example for illustration. In actual application, the foregoing functions can be allocated to different modules and implemented as required. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may be one or more physical units, may be located in one place, or may be distributed on different places. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
performing first constant voltage charging on a battery at a present charging voltage, wherein the present charging voltage is greater than an end-of-precharge voltage of the battery and less than a maximum charging voltage of the battery, wherein the maximum charging voltage represents a withstand voltage of a positive electrode material, an electrolyte, or a positive electrode current collector of the battery, and wherein the end-of-precharge voltage is a critical voltage at which the battery changes from an overdischarge state to a normal discharge state;
determining a current relaxation time while performing the first constant voltage charging on the battery, wherein the current relaxation time reflects a change of an electrochemical reaction rate in the battery;
obtaining a present state of charge (SOC) of the battery;
calculating a would-be charging current based on the current relaxation time and the present SOC; and
performing at least one of:
performing constant current charging on the battery at the would-be charging current, determining a first voltage of a first preset threshold as a would-be charging voltage and performing a second constant voltage charging on the battery at the would-be charging voltage when a second voltage of the battery reaches the first preset threshold while performing the constant current charging, and performing a third constant voltage charging on the battery at the maximum charging voltage until a quantity of electricity in the battery reaches a full-charge quantity of electricity when the second voltage reaches the maximum charging voltage while performing the constant current charging, wherein the first voltage is less than the maximum charging voltage, and wherein the battery reaches the full-charge quantity of electricity when the battery is fully charged; or
determining a third voltage corresponding to the would-be charging current as the would-be charging voltage, performing the second constant voltage charging on the battery, repeating each of performing the first constant voltage charging on the battery, determining the current relaxation time, obtaining the present SOC, and calculating the would-be charging current, during a constant voltage charging process until the would-be charging voltage reaches the maximum charging voltage, and performing the third constant voltage charging on the battery until the quantity of electricity reaches the full-charge quantity of electricity.

2. The charging method of claim 1, further comprising:
determining a first moment when a peak value of a charging current occurs while performing the first constant voltage charging on the battery;
determining a second moment when a value of the charging current is a second preset threshold or a change rate of the charging current is less than a preset change rate while performing the first constant voltage charging on the battery, wherein the first moment is earlier than the second moment; and
further determining the current relaxation time based on the first moment and the second moment.

3. The charging method of claim 1, further comprising further calculating the would-be charging current according to a formula, wherein the formula is:

$$I = C + K \times \tau^M (SOC),$$

wherein I represents the would-be charging current, wherein $\tau$ represents the current relaxation time, wherein SOC in the formula represents the present SOC of the battery, wherein K is a proportionality coefficient, wherein C is a constant greater than or equal to zero, wherein M is an exponent coefficient, wherein $M \neq 0$, wherein a charging parameter comprises at least one of C, K, or M, wherein the charging parameter is either preset or is set based on a battery parameter, and wherein the battery parameter comprises at least one of the present SOC of the battery, a present state of health (SOH) of the battery, the current relaxation time, a present temperature of the battery, or a present state of safety (SOS) of the battery.

4. The method of claim 2, further comprising further calculating the would-be charging current according to a formula, wherein the formula is:

$$I = C + K \times \tau^M (SOC),$$

wherein I represents the would-be charging current, wherein $\tau$ represents the current relaxation time, wherein SOC in the formula represents the present SOC of the battery, wherein K is a proportionality coefficient, wherein C is a constant greater than or equal to zero, wherein M is an exponent coefficient, wherein $M \neq 0$, wherein a charging parameter comprises at least one of C, K, or M, wherein the charging parameter is either preset or is set based on a battery parameter, and wherein the battery parameter comprises at least one of the present SOC of the battery, a present state of health (SOH) of the battery, the current relaxation time, a present temperature of the battery, or a present state of safety (SOS) of the battery.

5. The method of claim 3, further comprising:
setting the charging parameter based on the battery parameter; and
adjusting, in response to the setting the charging parameter, the charging parameter based on the battery parameter.

6. The method of claim 4, further comprising:
setting the charging parameter based on the battery parameter; and
adjusting, in response to the setting the charging parameter, the charging parameter based on the battery parameter.

7. A charging apparatus, comprising:
a memory configured to store instructions; and
a processor coupled to the memory and configured to:
to perform first constant voltage charging on a battery at a present charging voltage, wherein the present charging voltage is greater than an end-of-precharge voltage of the battery and less than a maximum charging voltage of the battery, wherein the maximum charging voltage represents a withstand voltage of a positive electrode material, an electrolyte, or a positive electrode current collector of the battery, and wherein the end-of-precharge voltage is a critical voltage at which the battery changes from an overdischarge state to a normal discharge state;
determine a current relaxation time while to performing the first constant voltage charging on the battery, wherein the current relaxation time reflects a change of an electrochemical reaction rate in the battery;
obtain the present state of charge (SOC) of the battery;
calculate a would-be charging current based on the current relaxation time and the present SOC; and
perform at least one of:
perform constant current charging on the battery at the would-be charging current, determine a first voltage of a first preset threshold as a would-be charging voltage and perform a second constant voltage charging on the battery at the would-be charging voltage when a second voltage of the battery reaches the first preset threshold while performing the constant current charging, and perform a third constant voltage charging on the battery at the maximum charging voltage until a quantity of electricity in the battery reaches a full-charge quantity of electricity when the second voltage reaches the maximum charging voltage while performing the constant current charging, wherein the first voltage is less than the maximum charging voltage, and wherein the battery reaches the full-charge quantity of electricity when the battery is fully charged; or
determine a third voltage corresponding to the would-be charging current as the would-be charging voltage, to perform the second constant voltage charging on the battery, repeat each of performing the first constant voltage charging on the battery, determining the current relaxation time, obtaining the present SOC, and calculating the would-be charging current, during a constant voltage charging process until the would-be charging voltage reaches the maximum charging voltage, and to perform the third constant voltage charging on the battery until the quantity of electricity reaches the full-charge quantity of electricity.

8. The charging apparatus of claim 7, wherein the processor is further configured to:
determine a first moment when a peak value of a charging current occurs while performing the first constant voltage charging on the battery;
determine a second moment when a value of the charging current is a second preset threshold or a change rate of the charging current is less than a preset change rate while performing the first constant voltage charging on the battery, wherein the first moment is earlier than the second moment; and
further determine the current relaxation time based on the first moment and the second moment.

9. The charging apparatus of claim 7, wherein the processor is further configured to further calculate the would-be charging current according to a formula, and wherein the formula is:

$$I = C + K \times \tau^M (SOC),$$

wherein I represents the would-be charging current, wherein $\tau$ represents the current relaxation time, wherein SOC in the formula represents the present SOC of the battery, wherein K is a proportionality coefficient, wherein C is a constant greater than or equal to zero, wherein M is an exponent coefficient, wherein $M \neq 0$, wherein a charging parameter comprises at least one of C, K, or M, wherein the charging parameter is either preset or is set based on a battery parameter, and wherein the battery parameter comprises at least one of the present SOC of the battery, a present state of health (SOH) of the battery, the current relaxation time, a present temperature of the battery, or a present state of safety (SOS) of the battery.

10. The charging apparatus of claim 8, wherein the processor is further configured to further calculate the would-be charging current according to a formula, wherein the formula is:

$$I = C + K \times \tau^M (SOC),$$

wherein I represents the would-be charging current, wherein $\tau$ represents the current relaxation time, wherein SOC in the formula represents the present SOC of the battery, wherein K is a proportionality coefficient, wherein C is a constant greater than or equal to zero, wherein M is an exponent coefficient, wherein $M \neq 0$, wherein a charging parameter comprises at least one of C, K, or M, wherein the charging parameter is either preset or is set based on a battery parameter, and wherein the battery parameter comprises at least one of the present SOC of the battery, a present state of health (SOH) of the battery, the current relaxation time, a present temperature of the battery, or a present state of safety (SOS) of the battery.

11. The charging apparatus of claim 9, wherein the processor is further configured to:
set the charging parameter based on the battery parameter; and
adjust, in response to the setting the charging parameter, the charging parameter based on the battery parameter.

12. The charging apparatus of claim 10, wherein the processor is further configured to:
set the charging parameter based on the battery parameter; and
adjust, in response to the setting the charging parameter, the charging parameter based on the battery parameter.

13. A computer program product comprising computer-executable instructions stored on a non-transitory computer-readable medium that, when executed by a processor, cause a charging apparatus to:
perform first constant voltage charging on a battery at a present charging voltage, wherein the present charging voltage is greater than an end-of-precharge voltage of the battery and less than a maximum charging voltage of the battery, wherein the maximum charging voltage represents a withstand voltage of a positive electrode material, an electrolyte, or a positive electrode current collector of the battery, and wherein the end-of-precharge voltage is a critical voltage at which the battery changes from an overdischarge state to a normal discharge state;

determine a current relaxation time while performing the first constant voltage charging on the battery, wherein the current relaxation time reflects a change of an electrochemical reaction rate in the battery;

obtain a present state of charge (SOC) of the battery;

calculate a would-be charging current based on the current relaxation time and the present SOC; and perform at least one of:

perform constant current charging on the battery at the would-be charging current, determine a first voltage of a first preset threshold as a would-be charging voltage and perform a second constant voltage charging on the battery at the would-be charging voltage when a second voltage of the battery reaches the first preset threshold during the constant current charging, and perform a third constant voltage charging on the battery at the maximum charging voltage until a quantity of electricity in the battery reaches a full-charge quantity of electricity when the second voltage reaches the maximum charging voltage during the constant current charging, wherein the first voltage is less than the maximum charging voltage, and wherein the battery reaches the full-charge quantity of electricity when the battery is fully charged; or determine a third voltage corresponding to the would-be charging current as the would-be charging voltage, perform the second constant voltage charging on the battery, repeat each of performing the first constant voltage charging on the battery, determining the current relaxation time, obtaining the present SOC, and calculating the would-be charging current, during a constant voltage charging process until the would-be charging voltage reaches the maximum charging voltage, and perform the third constant voltage charging on the battery until the quantity of electricity reaches the full-charge quantity of electricity.

14. The computer program product of claim 13, wherein the computer-executable instructions further cause the charging apparatus to:

determine a first moment when a peak value of a charging current occurs while performing the first constant voltage charging on the battery;

determine a second moment when a value of the charging current is a second preset threshold or a change rate of the charging current is less than a preset change rate while performing the first constant voltage charging on the battery, wherein the first moment is earlier than the second moment; and further determine the current relaxation time based on the first moment and the second moment.

15. The computer program product of claim 13, wherein the computer-executable instructions further cause the charging apparatus to further calculate the would-be charging current according to a formula, and wherein the formula is:

$$I=C+K\times\tau^M(SOC),$$

wherein I represents the would-be charging current, wherein $\tau$ represents the current relaxation time, wherein SOC in the formula represents the present SOC of the battery, wherein K is a proportionality coefficient, wherein C is a constant greater than or equal to zero, wherein M is an exponent coefficient, wherein M≠0, wherein a charging parameter comprises at least one of C, K, M, wherein the charging parameter is either preset or is set based on a battery parameter, and wherein the battery parameter comprises at least one of the present SOC of the battery, a present state of health (SOH) of the battery, the current relaxation time, a present temperature of the battery, or a present state of safety (SOS) of the battery.

16. The computer program product of claim 14, wherein the computer-executable instructions further cause the charging apparatus to further calculate the would-be charging current according to a formula, and wherein the formula is:

$$I=C+K\times\tau^M(SOC),$$

wherein I represents the would-be charging current, wherein $\tau$ represents the current relaxation time, wherein SOC in the formula represents the present SOC of the battery, wherein K is a proportionality coefficient, wherein C is a constant greater than or equal to zero, wherein M is an exponent coefficient, wherein M≠0, wherein a charging parameter comprises at least one of C, K, or M, wherein the charging parameter is either preset or is set based on a battery parameter, and wherein the battery parameter comprises at least one of the present SOC of the battery, a present state of health (SOH) of the battery, the current relaxation time, a present temperature of the battery, or a present state of safety (SOS) of the battery.

17. The computer program product of claim 15, wherein the computer-executable instructions further cause the charging apparatus to set the charging parameter based on the battery parameter.

18. The computer program product of claim 16, wherein the computer-executable instructions further cause the charging apparatus to set the charging parameter based on the battery parameter.

19. The computer program product of claim 18, wherein the computer-executable instructions further cause the charging apparatus to adjust, in response to the setting the charging parameter, the charging parameter based on the battery parameter.

20. The computer program product of claim 17, wherein the computer-executable instructions further cause the charging apparatus to adjust, in response to the setting the charging parameter, the charging parameter based on the battery parameter.

* * * * *

UNITED STATES PATENT AND TRADEMARK OFFICE
CERTIFICATE OF CORRECTION

PATENT NO. : 12,015,296 B2
APPLICATION NO. : 17/342878
DATED : June 18, 2024
INVENTOR(S) : Peng Lu, Xiaohu He and Jun Wu It is certified that error appears in the above-identified patent and that said Letters Patent is hereby corrected as shown below:

On the Title Page

Page 2, item (56) References Cited, Foreign Patent Documents: "IN 102906961 A 1/2013" should read "CN 102906961 A 1/2013"

Page 2, item (56) References Cited, Foreign Patent Documents: "IN 104752657 A 7/2015" should read "CN 104752657 A 7/2015"

In the Claims

Claim 2, Column 22, Line 11: "The charging method" should read "The method"

Claim 3, Column 22, Line 23: "The charging method" should read "The method"

Claim 6, Column 23, Line 10: "to perform first" should read "perform first"

Signed and Sealed this
Sixth Day of August, 2024

*Katherine Kelly Vidal*

Katherine Kelly Vidal
*Director of the United States Patent and Trademark Office*